United States Patent
Qiao et al.

(10) Patent No.: US 11,729,602 B2
(45) Date of Patent: Aug. 15, 2023

(54) TERMINAL SOFTWARE UPGRADE METHOD, TERMINAL SOFTWARE UPGRADE APPARATUS AND STORAGE MEDIUM

(71) Applicant: BEIJING XIAOMI MOBILE SOFTWARE CO., LTD., Beijing (CN)

(72) Inventors: Guangjun Qiao, Beijing (CN); Bing Zhao, Beijing (CN); Shuxiao Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 155 days.

(21) Appl. No.: 17/334,787

(22) Filed: May 30, 2021

(65) Prior Publication Data
US 2022/0116762 A1 Apr. 14, 2022

(30) Foreign Application Priority Data
Oct. 9, 2020 (CN) .......................... 202011074142.4

(51) Int. Cl.
*H04W 4/00* (2018.01)
*H04W 8/18* (2009.01)
(Continued)

(52) U.S. Cl.
CPC ............. *H04W 8/183* (2013.01); *H04W 4/80* (2018.02); *H04W 12/06* (2013.01)

(58) Field of Classification Search
CPC ....... H04W 8/183; H04W 4/80; H04W 12/06; H04W 28/04; H04W 72/04;
(Continued)

(56) References Cited

U.S. PATENT DOCUMENTS 9,471,330 B2   10/2016   Pinder
9,496,925 B2 *   11/2016   Troberg ............... H04B 5/0037
(Continued)

FOREIGN PATENT DOCUMENTS

| CN | 101521730 A | * | 9/2009 | |
| CN | 102122248 B | * | 10/2013 | |
| CN | 104486672 A | * | 4/2015 | ......... H04N 21/4363 |

OTHER PUBLICATIONS

Extended European Search Report in Application No. 21182633.4, dated Dec. 16, 2021.

*Primary Examiner* — Phuongchau Ba Nguyen
(74) *Attorney, Agent, or Firm* — Syncoda LLC; Feng Ma

(57) ABSTRACT

A terminal software upgrade method can be applied to a terminal that is installed with a near-field communication sensing circuit. The terminal software upgrade method can include: in response to a distance between a near-field communication instruction writing circuit and the terminal reaching an effective communication distance of a near-field communication, writing instruction information sent by the near-field communication instruction writing circuit into the near-field communication sensing circuit, wherein the instruction information comprises at least boot-up instruction information and upgrade configuration information; and controlling the terminal to boot up via the near-field communication sensing circuit, based on the boot-up instruction information, and upgrading software of the terminal based on the upgrade configuration information.

16 Claims, 7 Drawing Sheets

(51) Int. Cl.
*H04W 4/80* (2018.01)
*H04W 12/06* (2021.01)

(58) Field of Classification Search
CPC .. H04W 72/042; H04W 88/08; H04B 5/0031; H04B 5/0025; H04L 67/34; H04L 5/0007; G06F 8/65; G06F 9/4416
See application file for complete search history.

(56) References Cited

U.S. PATENT DOCUMENTS

| | | | | |
|---|---|---|---|---|
| 2011/0154008 | A1* | 6/2011 | Weng | G06F 9/4406 713/300 |
| 2011/0191583 | A1* | 8/2011 | Liu | H04N 21/818 717/173 |
| 2015/0178064 | A1* | 6/2015 | Cairns | G06F 8/65 717/171 |
| 2015/0281873 | A1 | 10/2015 | Ojala | |
| 2016/0261973 | A1* | 9/2016 | Socol | H04W 4/80 |
| 2016/0274637 | A1* | 9/2016 | Kang | G06F 9/4406 |
| 2018/0048473 | A1* | 2/2018 | Miller | H04L 9/30 |
| 2019/0079746 | A1* | 3/2019 | Thomas | G06F 21/572 |
| 2019/0258472 | A1* | 8/2019 | Kim | H04B 5/0031 |

* cited by examiner

TERMINAL SOFTWARE UPGRADE METHOD, TERMINAL SOFTWARE UPGRADE APPARATUS AND STORAGE MEDIUM

CROSS-REFERENCE TO RELATED APPLICATION

This application claims priority to Chinese Patent Application No. 202011074142.4, field on Oct. 9, 2020, the disclosure of which is hereby incorporated by reference in its entirety.

BACKGROUND

Terminal software upgrade refers to a way of upgrading a software system inside a terminal device to solve defects of a previous version. At present, a commonly used terminal software upgrade method is an Over-the-Air Technology (OTA) upgrade method, that is, the terminal device downloads an upgrade package on a remote server through a wireless network to upgrade the software systems or application therein.

SUMMARY

The present disclosure relates generally to the technical field of software upgrades, and more specifically to a terminal software upgrade method, a terminal software upgrade apparatus and a storage medium.

According to a first aspect of the embodiments of the present disclosure, there is provided a terminal software upgrade method. The terminal software upgrade method is applied to a terminal, and the terminal us installed with a near-field communication sensing circuit. The terminal software upgrade method may include: in response to a distance between a near-field communication instruction writing circuit and the terminal reaching an effective communication distance of a near-field communication, writing instruction information sent by the near-field communication instruction writing circuit into the near-field communication sensing circuit, wherein the instruction information comprises at least boot-up instruction information and upgrade configuration information; and controlling the terminal to boot up via the near-field communication sensing circuit, based on the boot-up instruction information, and upgrading software of the terminal based on the upgrade configuration information.

According to a second aspect of the embodiments of the present disclosure, there is provided a terminal software upgrade apparatus. The terminal software upgrade apparatus is applied to a terminal and the terminal is installed with a near-field communication sensing circuit. The terminal software upgrade apparatus may include: a writing module configured to write instruction information sent by the near-field communication instruction writing circuit into the near-field communication sensing circuit, in response to a distance between a near-field communication instruction writing circuit and the terminal reaching an effective communication distance of a near-field communication, wherein the instruction information comprises at least boot-up instruction information and upgrade configuration information; a boot-up module configured to control the terminal to boot up via the near-field communication sensing circuit, based on the boot-up instruction information; and an upgrading module configured to upgrade software of the terminal based on the upgrade configuration information.

According to a third aspect of the embodiments of the present disclosure, there is provided a terminal software upgrade device. The terminal software upgrade device may include a processor; and
a memory for storing instructions executable by the processor;
wherein, the processor is configured to perform the terminal software upgrade method described in the first aspect of the present disclosure or any one of the embodiments according to the first aspect.

According to a fourth aspect of the embodiments of the present disclosure, there is provided a computer-readable storage medium having computer programs stored thereon, when the programs are executed by a processor, the terminal software upgrade method described in the first aspect of the present disclosure or any one of the embodiments according to the first aspect.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the disclosure, show embodiments in accordance with the disclosure, and together with the specification are used to explain the principle of the disclosure.

DETAILED DESCRIPTION

Figure 1:
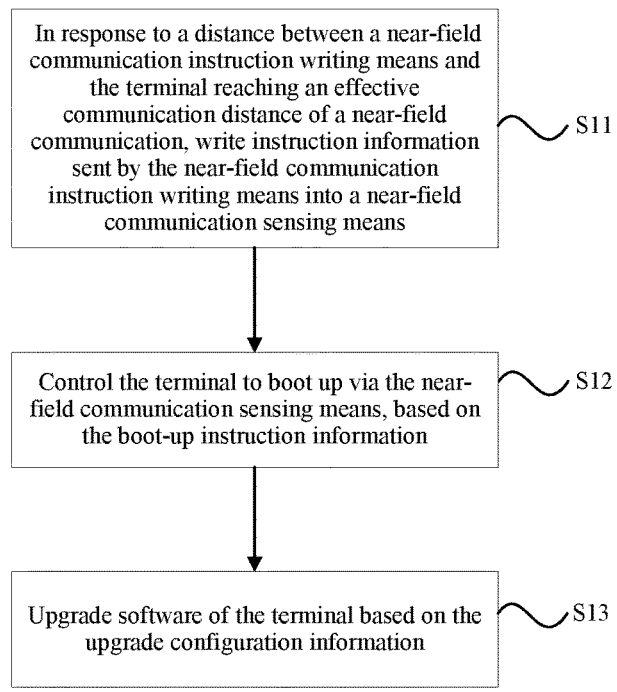
FIG. 1 is a flowchart showing a terminal software upgrade method according to some embodiments.

The exemplary embodiments will be described in detail herein, and examples thereof are shown in the accompanying drawings. When the following description refers to the drawings, unless otherwise indicated, the same numbers in different drawings indicate the same or similar elements. The implementation described in the following exemplary embodiments does not represent all implementations consistent with the present disclosure. Rather, they are merely examples of apparatus and methods consistent with some aspects of the present disclosure as detailed in the appended claims.

An Over-the-Air Technology (OTA) upgrade method is a commonly used method for upgrading software in terminal device. The Over-the-Air upgrade method is based on downloading an upgrade package on a remote server to the terminal device via a wireless network, and upgrading the software in the terminal device by restarting the terminal device.

However, when an OTA upgrade method is used to upgrade a terminal device, it often requires user to perform related operations on the terminal device. Therefore, in the case of a system upgrading for an unopened terminal device, such as software upgrades required for hidden dangers found in the unopened terminal device before sales, or software upgrades required for an iteration of the system software, and so on, it is necessary to manually open a package of the unopened terminal device, manually upgrade the system or application, and manually re-packaging the terminal device and other steps to achieve the upgrade of unopened terminal device, which will reduce work efficiency and increase work costs.

For example, in daily life, there are often situations where it is necessary to upgrade the software in the terminal device under the premise of ensuring that the terminal device has a complete package. For example, software upgrades are required for hidden dangers found in the unopened terminal device before sales, or software upgrades are required for an iteration of the system software, and so on. At present, the conventional operation is realized by manually opening a package of an unopened terminal device, manually operating the upgrade of the system software or application, manually re-packing and so forth. Since the current upgrade method at least requires steps such as opening the package of the unopened terminal device first, finally re-packing the terminal device to ensure that the terminal device after the software upgrade has a package, it will cause an increase in work costs and a decrease in work efficiency.

Near-field Communication (NFC) is an emerging technology. Devices (such as mobile terminals) that apply the Near-field Communication technology can transmit data or instructions without contacting. In a near-field communication working mode, a master device and a slave device may be involved. In the case of non-contact, the master device can transmit data to the slave device, and the slave device can perform a corresponding operation based on the received data.

The terminal software upgrade method provided by the present disclosure is applied to a terminal, and upgrade software in the terminal by using the near-field communication technology. Among them, the terminal is equipped with a near-field communication sensing circuit. It is understandable that the terminal described in the present disclosure may be a smart device with a built-in operating system or application which can be run. The operating system or application can be upgraded and iterated over time. In one example, the terminal may be a smart mobile terminal, a notebook computer or a tablet computer, etc. In the present disclosure, the terminal is not specifically limited.

The terminal software upgrade method provided by the present disclosure can write boot-up instruction information and upgrade configuration information into a near-field communication sensing circuit installed in the terminal through a near-field communication instruction writing circuit, control the terminal to boot up through the near-field communication sensing circuit, based on the boot-up instruction information, and upgrade the software of the terminal based on the upgrade configuration information, thereby ensuring that the software of terminal can be upgraded without opening the package of the terminal.

It should be noted that the near-field communication sensing circuit described in the embodiments of the present disclosure can be understood as a slave device applying near-field communication technology, and the near-field communication instruction writing circuit can be understood as a master device applying near-field communication technology. Among them, the master device can write information to the slave device.

FIG. 1 is a flowchart showing a terminal software upgrade method according to some embodiments.

In some embodiments of the present disclosure, as shown in FIG. 1, the terminal software upgrade method includes steps S11 to S13, and each step will be described respectively below.

In step S11, in response to a distance between a near-field communication instruction writing circuit and a terminal reaching an effective communication distance of a near-field communication, instruction information sent by the near-field communication instruction writing circuit is written into a near-field communication sensing circuit. Wherein, the instruction information includes at least boot-up instruction information and upgrade configuration information.

In the embodiment of the present disclosure, the near-field communication sensing circuit and the near-field communication instruction writing circuit may perform near-field communication based on the near-field communication technology. Among them, when the distance between the near-field communication sensing circuit and the near-field communication instruction writing circuit reaches the effective communication distance of the near-field communication, the near-field communication instruction writing circuit can generate a near-field communication signal and perform a real-time information interaction with the near-field communication sensing circuit based on the near-field communication signal. For example, the near-field communication instruction writing circuit can send and write the instruction information to the near-field communication sensing circuit.

In step S12, based on the boot-up instruction information, the terminal is controlled to boot up via the near-field communication sensing circuit.

In some embodiments of the present disclosure, the boot-up instruction information may be a kind of preset instruction information. For example, the preset instruction information may be a kind of extended information about a Type 4 Tag (T4T) instruction in the near-field communication protocol, which comes from protocol NFCForum-TS-T4T-1.0. In an example, the preset instruction information may have a specific identification, and through the specific identification, it can determine whether the boot-up instruction information is the preset instruction information. In the application process, if the boot-up instruction information is the preset instruction information, subsequently the terminal can be controlled to boot up based on the boot-up instruction information for software upgrades.

As a possible embodiment, if the boot-up instruction information is not the preset instruction information, the boot-up operation cannot be performed according to the boot-up instruction information written into the near-field communication sensing circuit, but keeping the terminal in a shutdown status. It should be noted that, controlling the terminal to boot up based on the boot-up instruction information being the preset instruction information can effectively prevent other providers or network hackers from booting up the terminal through illegal means and tampering the internal system or software of the terminal arbitrarily.

In some embodiments of the present disclosure, a chip pin of the near-field communication sensing circuit is physically connected to a boot-up pin of the terminal, so that the near-field communication sensing circuit can control the rise and reduction of a boot-up level of the terminal, thereby realizing the controlling for booting up or shut downing the terminal.

It can be understood that, in order to ensure effective physical connection between the chip pin in the near-field communication sensing circuit and the boot-up pin of the terminal, other components such as MOS transistors, resistors, and voltage levels are often required to be added. In the present disclosure, in the case of ensuring that the chip pin in the near-field communication sensing circuit is effectively connected to the boot-up pin of the terminal, the added components may not be specifically limited.

In step S13, software of the terminal is upgraded based on the upgrade configuration information.

In a possible example, the upgrade configuration information may include information about a download address of a software upgrade package. When the terminal is in a power-on status, the software upgrade package can be downloaded based on the information representing a download address of the software upgrade package in the upgrade configuration information, and the software of the terminal can be upgraded based on the upgrade package of the software.

The terminal software upgrade method provided by the present disclosure can ensure that software of an unopened terminal can be upgraded without opening a package of the terminal, by writing boot-up instruction information and upgrade configuration information into a near-field communication sensing circuit installed in the terminal via a near-field communication instruction writing circuit; based on the boot-up instruction information, controlling the terminal to boot up via the near-field communication sensing circuit; and upgrading the software of the terminal based on the upgrade configuration information.

It can be understood that, in another possible example, when the near-field communication instruction writing circuit has a storage space capable of storing the software upgrade package, the upgrade configuration information may also include information about the software upgrade package. In the application process, when the distance between the near-field communication instruction writing circuit and the terminal reaches the effective communication distance of the near-field communication, the software upgrade package can be directly written into the near-field communication sensing circuit of the terminal, and the software of the terminal can be upgraded based on the software upgrade package. By using this embodiment, it is possible to download the software upgrade package and upgrade the software of the terminal based on the software upgrade package, even when the terminal is not connected to the network.

In the embodiments of the present disclosure, software upgrade scenarios about downloading the software upgrade package in an OTA mode are mainly described. When downloading the software upgrade package based on the download address of the software upgrade package in the upgrade configuration information, it is often necessary that the terminal being in a network connection status. The present disclosure will illustrate the process of the terminal software upgrade method when the terminal is in a network connection status through the following embodiments.

Figure 2:
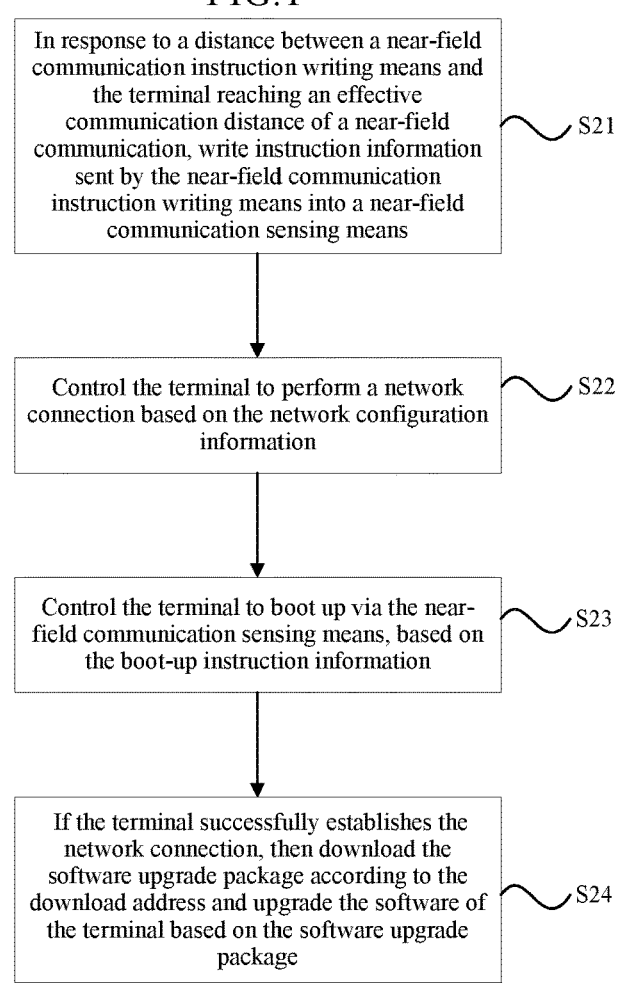
FIG. 2 is a flowchart showing another terminal software upgrade method according to some embodiments.

FIG. 2 is a flowchart showing another terminal software upgrade method according to some embodiments.

In some embodiments of the present disclosure, the instruction information written into the near-field communication sensing circuit may further include network configuration information, wherein the network configuration information may include a connection address and a password of an available network.

As shown in FIG. 2, the terminal software upgrade method may include step S21 to step S24. The steps will be described respectively below.

In step S21, in response to a distance between a near-field communication instruction writing circuit and a terminal reaching an effective communication distance of a near-field communication, instruction information sent by the near-field communication instruction writing circuit is written in the near-field communication sensing circuit. Wherein, the instruction information includes network configuration information, in addition to boot-up instruction information and upgrade configuration information. It should be noted that the upgrade configuration information includes at least a download address of a software upgrade package.

In step S22, based on the network configuration information, the terminal is controlled to connect to a network.

In step S23, based on the boot-up instruction information, the terminal is controlled to boot up via the near-field communication sensing circuit.

In step S24, if the terminal successfully establishes a network connection, the software upgrade package is downloaded according to the download address, and the software of the terminal is upgraded based on the software upgrade package.

Wherein, step S21 and step S23 are the same as step S11 and step S12 in the foregoing embodiment. The related explanations and descriptions and beneficial effects can refer to the above description of step S11 and step S12, which will not be repeated here. Steps S22 and S24 will be described in detail below.

In a possible embodiment, after controlling the terminal to boot up based on the boot-up instruction information, the connection between the terminal and the network can be realized based on the connection address and password of the available network in the network configuration information written in the near-field communication sensing circuit, so that the terminal can subsequently connect to a corresponding server or cloud to download the software upgrade package.

Furthermore, after the terminal successfully establishes the network connection, the software upgrade package can be downloaded to the corresponding server or cloud according to the download address of the software upgrade package, and the software of the terminal can be upgraded based on the software upgrade package. In this embodiment, before the software of the terminal is not upgraded, the software upgrade package can be stored in a server or cloud independent of the terminal, so as to reduce the occupation of the software upgrade package to the storage space of the near-field communication instruction writing circuit.

In the application process, users often need to know a current upgrade status or a current upgrade process of the software in the terminal. Therefore, by using other devices that establish a communication connection with the terminal to display the current upgrade status or upgrade process of the software, related information about the current upgrade status or current upgrade process of the software can be obtained without opening the terminal's packaging.

The present disclosure will use the following embodiments to describe the process of displaying the current upgrade status or the current upgrade process of the software by using other devices that establish the communication connection with the terminal. Among them, in the embodiment of the present disclosure, the other device that establishes a communication connection with the terminal and is used to display the current upgrade status or the current upgrade process of the software is referred to as a first device.

In a possible embodiment, based on the implementation of FIG. 1 or FIG. 2, the terminal software upgrade method may further include steps of sending upgrade status information of the terminal to the first device and displaying the upgrade status information of the terminal in the first device. For ease of description, the above steps are added on the basis of FIG. 1 as an example.

Figure 3:
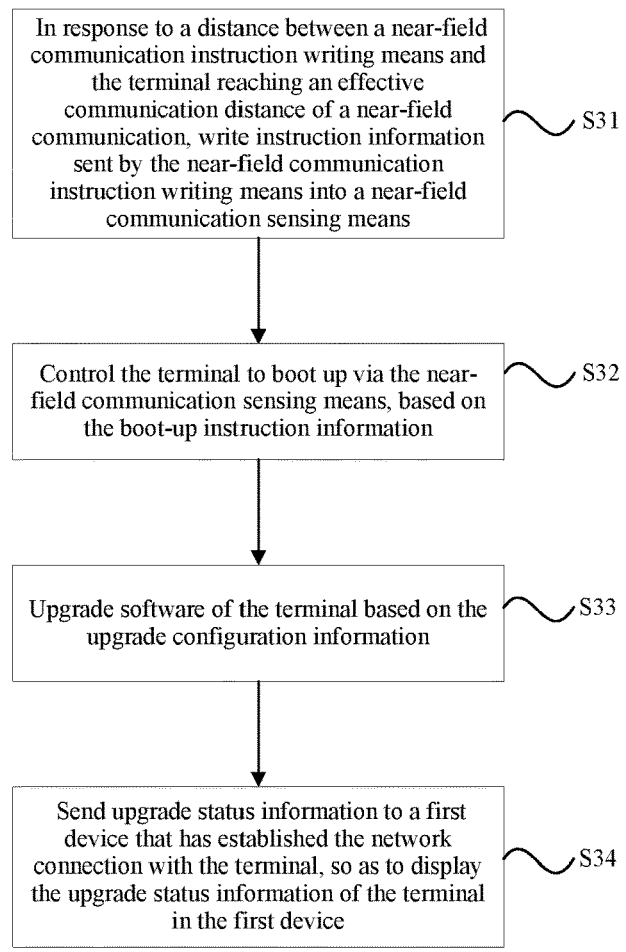
FIG. 3 is a flowchart showing yet another terminal software upgrade method according to some embodiments.

FIG. 3 is a flowchart showing yet another terminal software upgrade method according to some embodiments.

In some embodiments of the present disclosure, as shown in FIG. 3, the terminal software upgrade method includes steps S31 to S34. The steps S31 to S33 are the same as steps S11 to S13 in the previous embodiment. The related explanations and descriptions and beneficial effects can refer to the above description of steps S11 to S13, which will not be repeated here. Step S34 will be described in detail below.

In step S34, the upgrade status information is sent to the first device that has established the communication connection with the terminal, so as to display the upgrade status information of the terminal in the first device. Wherein, the upgrade status information includes one or more of an upgrade success, an upgrade failure, and an upgrade process.

In the application process, the terminal can establish a communication connection with the first device, and transmit the upgrade status information about the software in the terminal to the first device, and display the upgrade status information of the software through the first device. Wherein, the first device may be a device that is capable of establishing a communication connection with the terminal and displaying the upgrade status information. In an example, the first device may be a server that downloads a software upgrade package, or may be another terminal device that establishes a communication connection with the terminal and be independent of the terminal. In this disclosure, the first device is not specifically limited.

In order to further explain the terminal software upgrade method of the embodiments of the present disclosure, the present disclosure will be described through the following embodiments.

Figure 4:
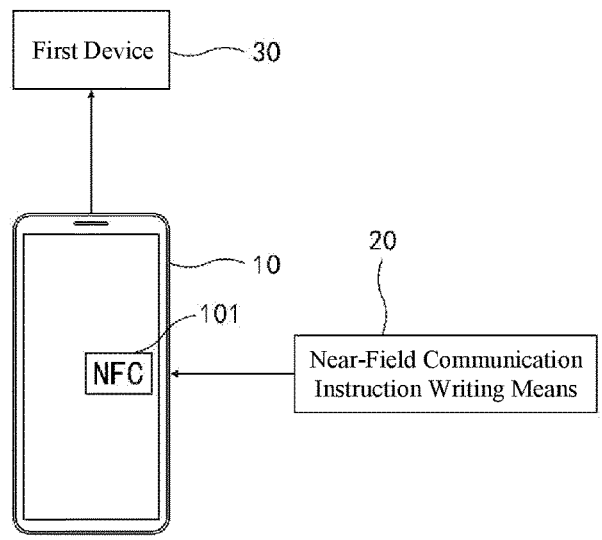
FIG. 4 shows a schematic diagram of a scenario for applying a terminal software upgrade method.

FIG. 4 shows a schematic diagram of a scenario for applying a terminal software upgrade method.

In an example, as shown in FIG. 4, when the distance between the near-field communication sensing circuit 101 installed in the terminal 10 and the near-field communication instruction writing circuit 20 reaches the effective communication distance of the near-field communication, the near-field communication instruction writing circuit 20 can activate the near-field communication sensing circuit 101, and write boot-up instruction information, upgrade configuration information, and network configuration information, etc., into the near-field communication sensing circuit 101.

By the physical connection between the chip pin of the near-field communication sensing circuit 101 with the boot-up pin of the terminal 10, the near-field communication sensing circuit 101 can, based on the boot-up instruction information, realize that the near-field communication sensing circuit 101 controls the boot-up level of the terminal 10 to rise, making the terminal 10 in the powered-on status.

Furthermore, based on the network configuration information, the terminal 10 can be placed in a network connected status, so that the near-field communication sensing circuit 101 can subsequently download the software upgrade package in the network connected status.

In an example, when the terminal 10 is powered on and connected to the network, the software upgrade package can be downloaded to the first device 30 corresponding to the download address, based on the information about the download address of the software upgrade package included in the upgrade configuration information, and the software upgrade of the terminal 10 is implemented based on the software upgrade package.

Usually, users need to know the current upgrade status or current upgrade process of the software in the terminal, and determine the next operation according to the current upgrade status or upgrade process. Therefore, in an example, it is possible to establish a communication connection between the terminal 10 and the first device 30, and transmit the current upgrade status information of the software in the terminal 10 to the first device 30, and display it in the first device 30.

If the first device 30 displays that the current upgrade status of the software is the upgrade success, it means that the software in the terminal 10 has been upgraded. If the first device 30 displays that the current upgrade status of the software is the upgrade failure, it means that the terminal 10 cannot upgrade the software through the terminal software upgrade method described in the embodiment of the present disclosure, and require a manual operation to upgrade the software.

In the application process, in order to ensure the accuracy of the software upgrade, it is often necessary to verify legality of a software upgrade. The present disclosure will illustrate the legality of the software upgrade through the following embodiments.

In a possible embodiment, based on the implementation of FIG. 1, FIG. 2 or FIG. 3, the terminal software upgrade method may further include a step of verifying the legality of the software upgrade. For ease of description, the above step is added on the basis of FIG. 1 as an example.

Figure 5:
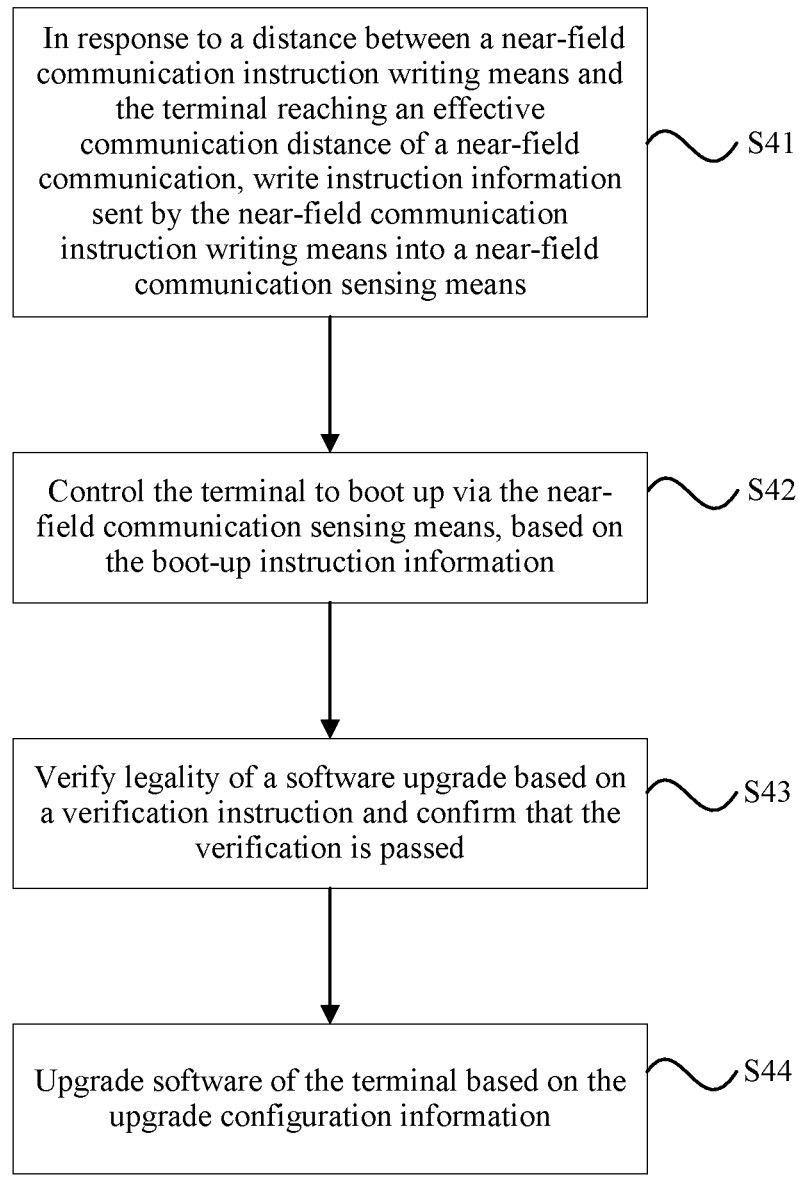
FIG. 5 is a flowchart showing yet another terminal software upgrade method according to some embodiments.

FIG. 5 is a flowchart showing yet another terminal software upgrade method according to some embodiments.

In some embodiments of the present disclosure, as shown in FIG. 5, the terminal software upgrade method includes steps S41 to S44. Among them, step S41, step S42, and step S44 are the same as steps S11 to S13 in the previous embodiment. The related explanations, descriptions, and beneficial effects can refer to the above description of steps S11 to S13, which will not be repeated here. Step S43 will be described in detail below.

In step S43, legality of a software upgrade is verified based on a verification instruction, and it is confirmed that the verification is passed.

In an example, specific verification information can be set in the upgrade configuration information, that is, by using the specific verification information, it is determined whether the upgrade configuration information is the upgrade configuration information set by the user, and is not illegal information sent by other providers, network hackers or spam websites. During the application process, if the verification information is included in the upgrade configuration information, it means that it is legal to download the software upgrade package based on the download address of the software upgrade package in the upgrade configuration information. Furthermore, the software upgrade package can be downloaded based on the download address of the software upgrade package in the upgrade configuration information, and upgrading to the software can be implemented based on the software upgrade package.

In the embodiments of the present disclosure, the legality of the software upgrade is verified through the verification instruction, and the software of the terminal is upgraded based on the upgrade configuration information only after the verification is determined to be passed, which can effectively avoid mistakenly implanting information that is not conducive to the terminal into the terminal. For example, installing network viruses and spam software from spam websites to the terminal, thereby causing disturbance to the system of the terminal.

In a possible embodiment, it is also possible to verify the legality of the software upgrade before controlling the terminal to connect to the network based on the network configuration information, and after the legality verification is passed, download the software upgrade package based on the download address of software upgrade package in the upgrade configuration information, and implement the software upgrade based on the downloaded software upgrade package.

Figure 6:
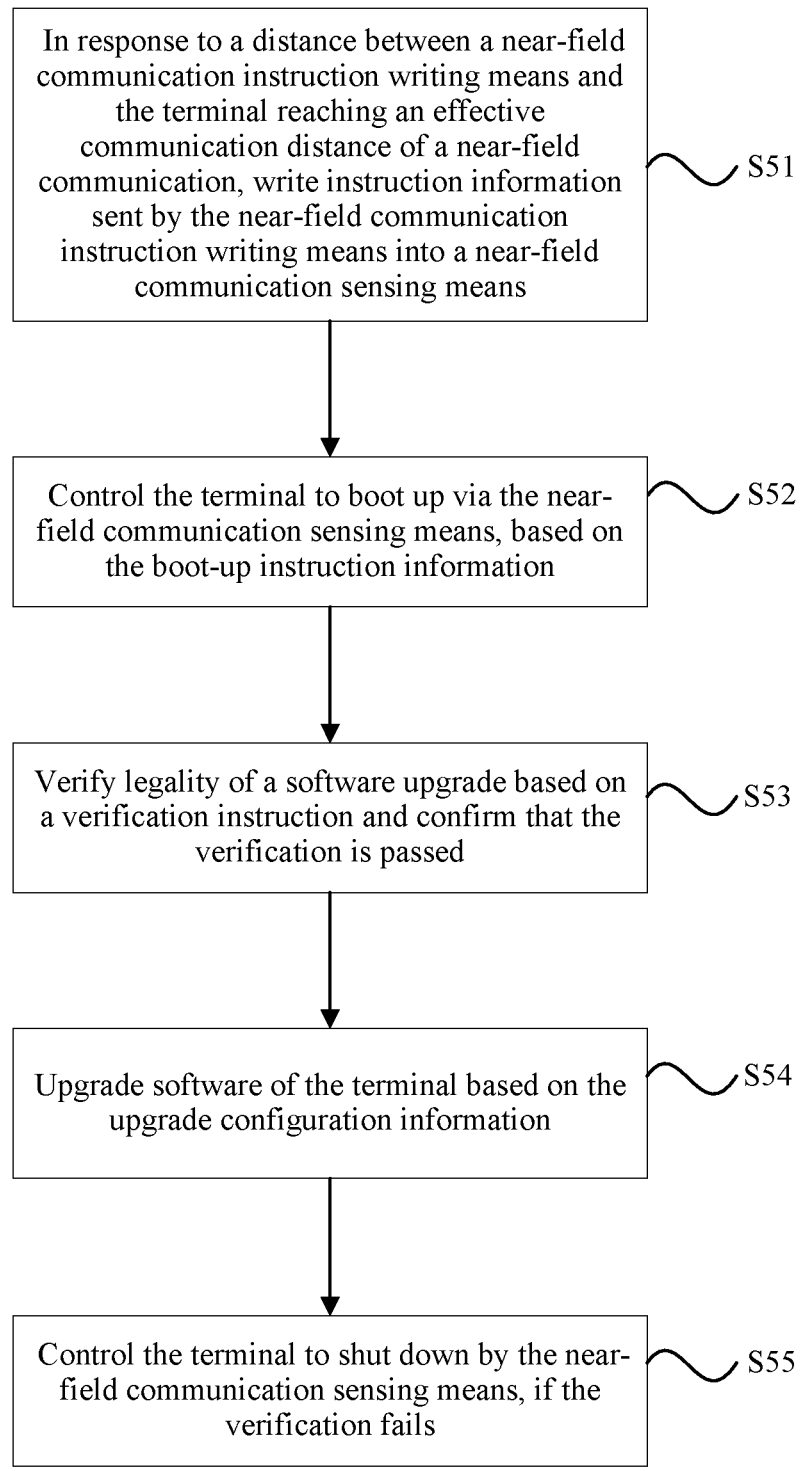
FIG. 6 is a flowchart showing yet another terminal software upgrade method according to some embodiments.

In another exemplary embodiment of the present disclosure, as shown in FIG. 6, the terminal software upgrade method includes steps S51 to S55, wherein, steps S51 to S54 are consistent with steps S41 to S44 of the above embodiment, and the related explanation and description can refer to the above description of step S41 to step S44, which will not be repeated here. Step S55 will be described in detail below.

In step S55, if the verification fails, the terminal is controlled to shut down through the near-field communication sensing circuit.

In the application process, if the verification instruction verifies that the software upgrade is not legal. For example, the upgrade configuration information is not the upgrade configuration information set by the user, but is the illegal information sent by network hackers or spam websites. At this time, it can be considered that the software upgrade is not legal, and the level of boot-up pin of the terminal can be lowered down through the chip pin of the near-field communication sensing circuit to realize the shutdown control of the terminal.

In addition to upgrading the software of the terminal, it is also necessary to delete operating traces of the software upgrade involved in the software upgrade process to ensure that the user will not find that the terminal has been upgraded when the terminal is boot up again. The present disclosure will illustrate the process of another terminal software upgrade method through the following embodiments.

In a possible embodiment, based on the implementation of FIG. 1, FIG. 2, FIG. 3, FIG. 5, or FIG. 6, the terminal software upgrade method may further include a step of deleting or clearing up operating traces of the software upgrade. For ease of description, the above step is added on the basis of FIG. 1 as an example.

Figure 7:
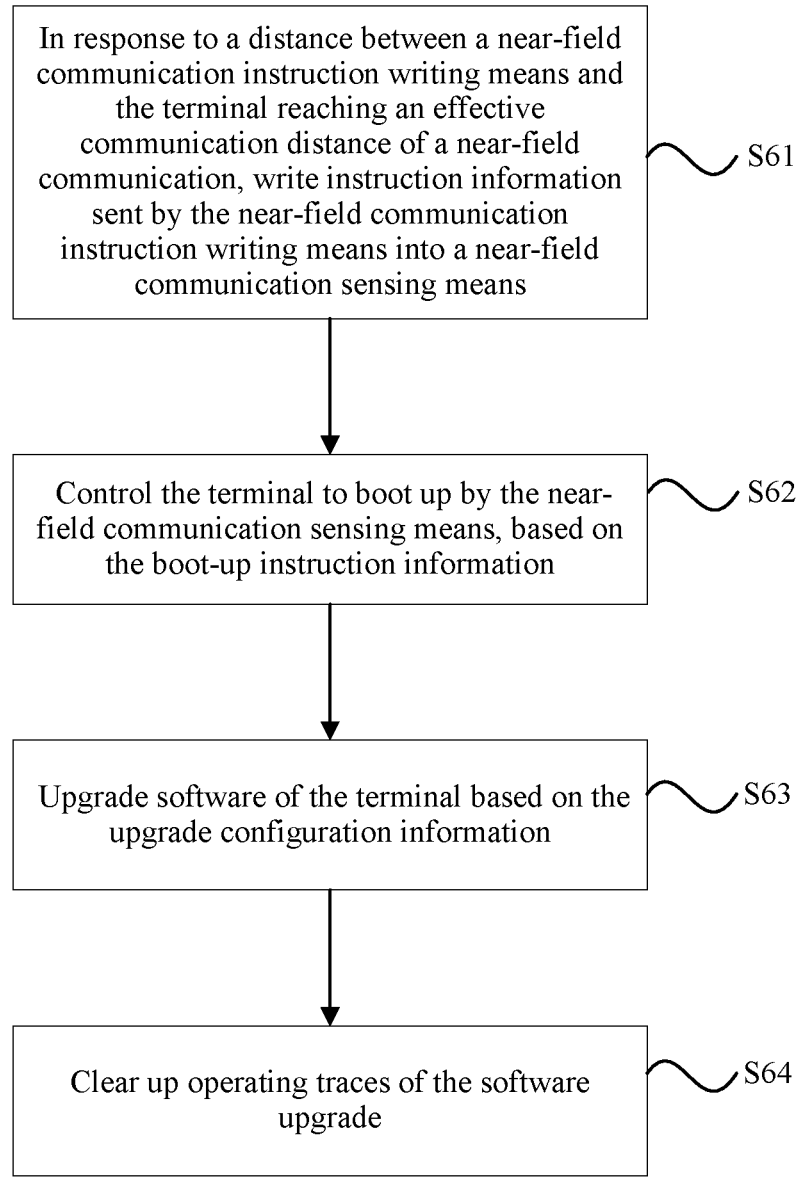
FIG. 7 is a flowchart showing yet another terminal software upgrade method according to some embodiments.

FIG. 7 is a flowchart showing yet another terminal software upgrade method according to some embodiments.

In some embodiments of the present disclosure, as shown in FIG. 7, the terminal software upgrade method includes steps S61 to S64, wherein steps S61 to S63 are consistent with steps S11 to S13 of the above-mentioned embodiment, and the relevant explanation and description as well as beneficial effects can refer to the above description of steps S11 to S13, which will not be repeated here. Step S64 will be described in detail below.

In step S64, operating traces of the software upgrade are cleared up or deleted.

In the application process, after the software of the terminal is upgraded based on the upgrade configuration information, the operating traces of the software upgrade can be cleared up to ensure that the user will not find that the terminal has been upgraded when the terminal is booted up again.

In the embodiments of the present disclosure, the terminal software upgrade method involved in the above-mentioned embodiments will be described below in combination with practical applications.

Figure 8:
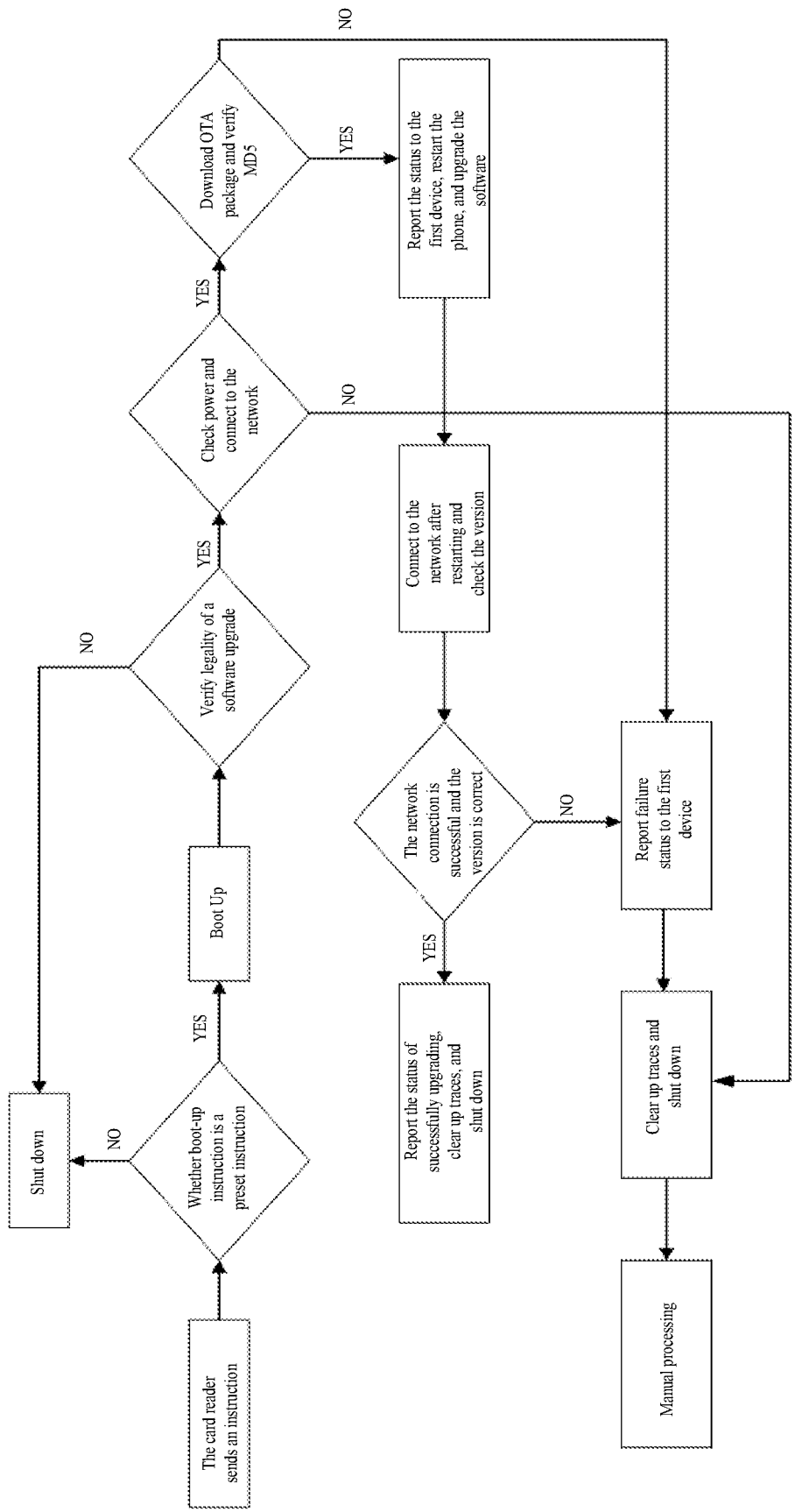
FIG. 8 is a flowchart showing yet another terminal software upgrade method according to some embodiments.

FIG. 8 is a flowchart showing yet another terminal software upgrade method according to some embodiments.

In an example, as shown in FIG. 8, the near-field communication instruction writing circuit is a card reader and the terminal is a mobile terminal as an example for description. In the application process, when the card reader is close to the mobile terminal installed with the near-field communication sensing circuit, and the distance between the card reader and the mobile terminal reaches the effective communication distance of the near-field communication, the card reader can write the boot-up instruction information into the near-field communication sensing circuit. If it is determined that the boot-up instruction information is the preset instruction information, the mobile terminal may be controlled to boot up based on the near-field communication sensing circuit. If it is determined that the boot-on instruction information is not the preset instruction information, the mobile terminal is kept in a shutdown status.

Furthermore, when the card reader writes instructions into the near-field communication sensing circuit, it also writes upgrade configuration information and network configuration information into the near-field communication sensing circuit. The upgrade configuration information includes at least a download address of the software upgrade package, and the network configuration information includes at least a connection address and a password of an available network. In the application process, before downloading the software upgrade package based on the download address of the software upgrade package in the upgrade configuration information, it is also necessary to determine the legality of the software upgrade. In an example, this can be achieved by determining whether the upgrade configuration information is the upgrade configuration information set by the user. If the upgrade configuration information is the upgrade configuration information set by the user, and not the illegal information sent by providers, network hackers or spam websites to disturb normal upgrade of the software, then the software upgrade package is downloaded based on the download address of the software upgrade package in the upgrade configuration information, so that the software can be upgraded subsequently based on the downloaded software upgrade package.

It should be noted that if it is determined that the software upgrade is not legal, the level of boot-up pin inside the terminal is lowered down by the chip pin of the near-field communication sensing circuit to realize the shutdown control of the terminal.

The complete progress of the software upgrade process cannot be ensured when the power of the mobile terminal is low, since the power of the mobile terminal is also consumed while the software is upgraded based on the downloaded software upgrade package. At this time, it is necessary to clear up the operating traces of the software upgrade in the software upgrade process, and control the mobile terminal to shut down through the near-field communication sensing circuit, that is, the terminal software upgrade method described in the present disclosure is not applied to upgrade the software. In an example, the software upgrade of the mobile terminal can be performed manually after opening the outer package of the mobile terminal, taking out the mobile terminal and charging the mobile terminal.

In an example, if the mobile terminal has sufficient power and is capable to meet an normal progress of the software upgrade, the integrity of the software upgrade package can be verified based on check code in the downloaded software upgrade package, such as Message Digest 5 (MD5). If the integrity check is passed, the software upgrading can be implemented based on the software upgrade package and the restarting operation of the mobile terminal. If the integrity check fails, it is necessary to clear up operating traces of the software upgrade in the software upgrade process, and control the mobile terminal to shut down through the near-field communication sensing circuit. In the application, the software can be upgraded by directly operating the mobile terminal manually.

In the process of upgrading the software, users often need to understand the current upgrade status or current upgrade process of the software in the mobile terminal, and determine the next operation according to the current upgrade status or current upgrade process. In a possible embodiment, the mobile terminal can establish a communication connection with a server independent of the mobile terminal, and transmit the current upgrade status information of the software in the mobile terminal to the server and display it in the server.

Furthermore, after the software is upgraded, an upgraded version of the software can also be checked to determine whether the currently upgraded version is a version that the user intends to upgrade. In the application process, it is necessary to check, based on the mobile terminal having the established network connection, the current upgraded software version of said mobile terminal. If the currently upgraded software version is the version that the user intends to upgrade, it means that the software has been successfully upgraded, and information about the successful software upgrade is sent to the server so that the user can know the information. It should be noted that after confirming that the software upgrade is successful, the operating traces of the software upgrade need to be cleared up to ensure that user will not find that the mobile terminal has been upgraded when booting up the mobile terminal again.

In another embodiment, if the currently upgraded software version is not the version that the user intends to upgrade, it means that the software has not been successfully upgraded. At this time, it is necessary to send information about the software upgrade failure to the server so that the user can know the information. At this time, since the current mobile terminal has the operating traces of software upgrade, it is also necessary to clear up the upgrade operating traces existing in the software upgrade process. Furthermore, the mobile terminal is controlled to shut down through the near-field communication sensing circuit, that is, the terminal software upgrade method described in the present disclosure is not applied to upgrade the software. In an example, the software upgrade of the mobile terminal can be performed manually after opening the outer package of the mobile terminal, taking out the mobile terminal and charging the mobile terminal.

It can be seen from the above description that the terminal software upgrade method provided by the present disclosure can ensure that software of an unopened terminal can be upgraded without opening a package of the terminal, by writing boot-up instruction information and upgrade configuration information into a near-field communication sensing circuit installed in the terminal via a near-field communication instruction writing circuit; based on the boot-up instruction information, controlling the terminal to boot up via the near-field communication sensing circuit; and upgrading the software of the terminal based on the upgrade configuration information.

Based on the same idea, the embodiment of the present disclosure also provides a terminal software upgrade apparatus.

It can be understood that, in order to implement the above-mentioned functions, the terminal software upgrade apparatus provided by the embodiments of the present disclosure includes hardware structures and/or software modules corresponding to each function. In combination with the units and algorithm steps of the examples disclosed in the embodiments of the present disclosure, the embodiments of the present disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the embodiments of the present disclosure.

Figure 9:
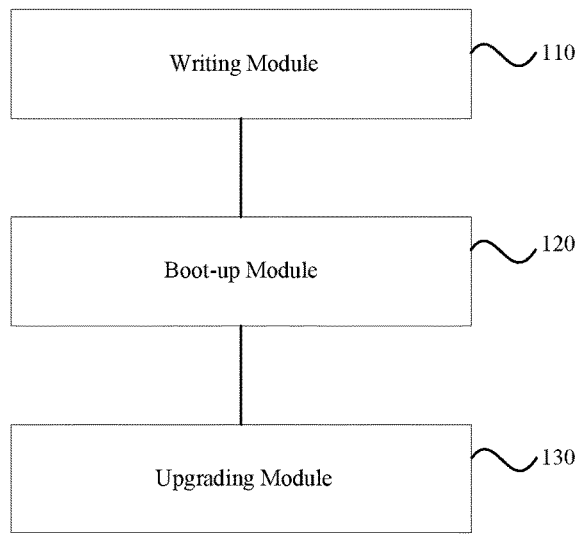
FIG. 9 is a block diagram showing a terminal software upgrade apparatus according to some embodiments.

FIG. 9 is a block diagram showing a terminal software upgrade apparatus according to some embodiments.

In some embodiments of the present disclosure, the terminal software upgrade apparatus is applied to the terminal. Referring to FIG. 9, the terminal software upgrade apparatus includes a writing module 110, a boot-up module 120, and an upgrading module 130, and each module will be introduced respectively below.

The writing module 110 may be configured to: in response to a distance between a near-field communication instruction writing circuit and the terminal reaching an effective communication distance of a near-field communication, write instruction information sent by the near-field communication instruction writing circuit into the near-field communication sensing circuit, wherein the instruction information comprises at least boot-up instruction information and upgrade configuration information.

The boot-up module 120 may be configured to control the terminal to boot up via the near-field communication sensing circuit, based on the boot-up instruction information.

The upgrading module 130 may be configured to upgrade software of the terminal based on the upgrade configuration information.

In some embodiments of the present disclosure, the instruction information further includes network configuration information, and the upgrade configuration information includes a download address of a software upgrade package. The terminal software upgrade apparatus also includes a network connecting module. The network connecting module will be described in detail below.

The network connecting module may be configured to control the terminal to perform a network connection based on the network configuration information.

The upgrading module 130 can upgrade the software of the terminal based on the upgrade configuration information in the following manner: if the terminal successfully establishes the network connection, then downloading the software upgrade package according to the download address and upgrading the software of the terminal based on the software upgrade package.

In some embodiments of the present disclosure, the terminal software upgrade apparatus further includes a display module. The display module will be described in detail below.

The display module may be configured to: send upgrade status information to a first device that has established the network connection with the terminal, so as to display the upgrade status information of the terminal in the first device, wherein the upgrade status information comprises one or more of an upgrade success, an upgrade failure, and an upgrade process.

In some embodiments of the present disclosure, the terminal software upgrade apparatus further includes a verification module. The verification module will be described in detail below.

The verification module may be configured to verify legality of a software upgrade based on a verification instruction, and confirm that the verification is passed.

In some embodiments of the present disclosure, the terminal software upgrade apparatus further includes a first control module. The control module will be described in detail below.

The first control module can be configured to control the terminal to shut down via the near-field communication sensing circuit, if the verification fails.

In some embodiments of the present disclosure, the terminal software upgrade apparatus further includes a clearing-up module. The clearing-up module will be described in detail below.

The clearing-up module can be configured to clear up operating traces of the software upgrade.

In some embodiments of the present disclosure, the boot-up module controls the terminal to boot up via the near-field communication sensing circuit based on the boot-up instruction information in following manner: controlling the terminal to boot up via the near-field communication sensing circuit, if the boot-up instruction information is a preset instruction.

In some embodiments of the present disclosure, the terminal software upgrade apparatus further includes a second control module. The control module will be described in detail below.

The second control module may be configured to maintain a shutdown status of the terminal, if the boot-up instruction information is not the preset instruction.

Regarding the apparatus in the foregoing embodiment, the specific manner in which each module performs operation has been described in detail in the embodiment of the method, and detailed description will not be given here.

Figure 10:
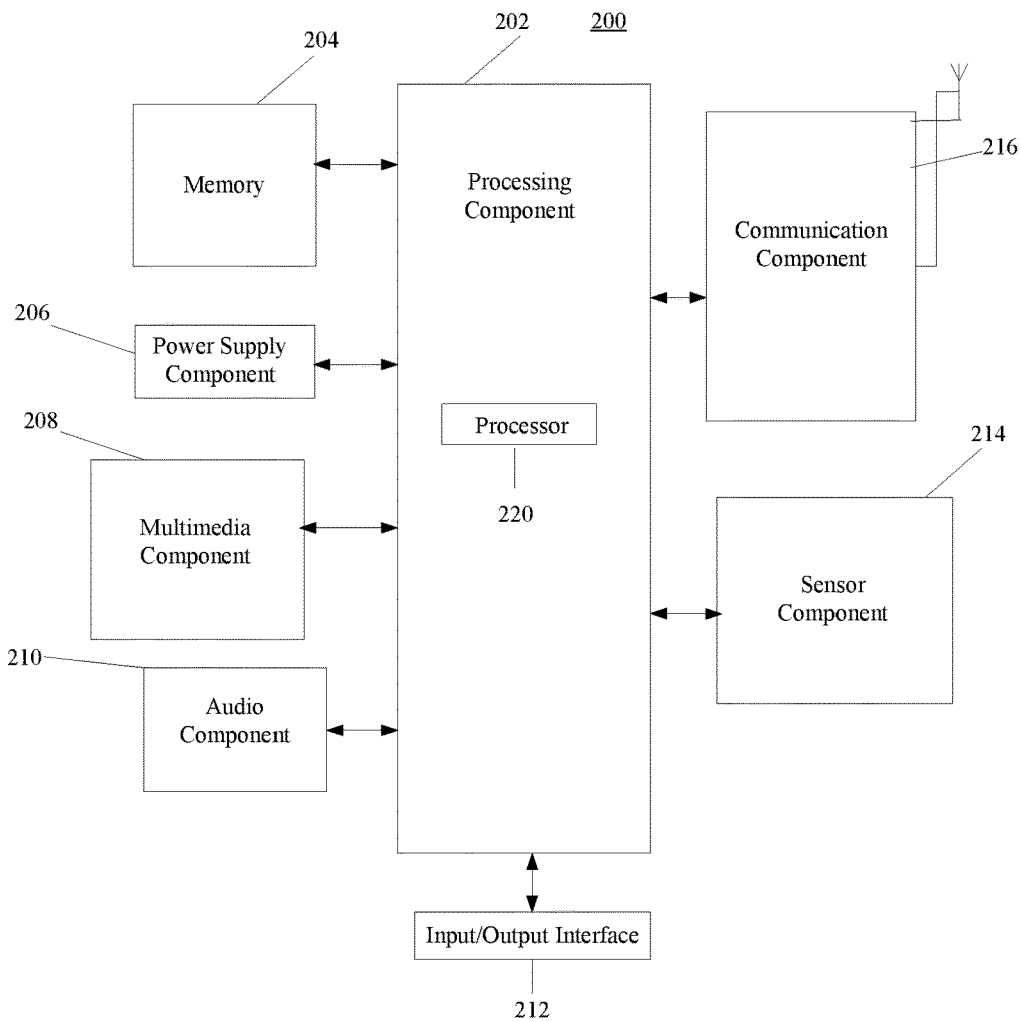
FIG. 10 is a block diagram showing a device for applying a terminal software upgrade method according to some embodiments.

FIG. 10 is a block diagram showing a device 200 applying a terminal software upgrade method according to some embodiments. For example, the device 200 for applying the terminal software upgrade method may be a mobile phone, a computer, a digital broadcasting terminal, a message transceiving device, a game console, a tablet device, medical equipment, fitness equipment, a personal digital assistant, etc.

Referring to FIG. 10, the device 200 may include one or more of the following components: a processing component 202, a memory 204, a power supply component 206, a multimedia component 208, an audio component 210, an input/output (I/O) interface 212, a sensor component 214, and a communication component 216

The processing component 202 generally controls the overall operations of the device 200 for terminal software upgrading, such as operations associated with displaying, telephone calls, data communication, camera operations, and recording operations. The processing component 202 may include one or more processors 220 to execute instructions to complete all or part of the steps in the above method. In addition, the processing component 202 may include one or more modules to facilitate interaction between the processing component 202 and other components. For example, the processing component 202 may include a multimedia module to facilitate interaction between the multimedia component 208 and the processing component 202.

The memory 204 is configured to store various types of data to support operations at the device 200 for terminal software upgrading. Examples of these data include instructions for any application or method operating on the device 200, contact data, phone book data, messages, pictures, videos, and so on. The memory 204 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power supply component 206 provides power to various components of the device 200 for terminal software upgrading. The power supply component 206 may include a power supply management system, one or more power supplies, and other components associated with generating, managing, and distributing power for the device 200 terminal software upgrading.

The multimedia component 208 includes a screen that provides an output interface between the device 200 for terminal software upgrading and the user. In some embodiments, the screen may include a liquid crystal display (LCD) and a touch panel (TP). IN some embodiments, an organic light-emitting diode (OLED) display can be employed.

If the screen includes a touch panel, then the screen may be implemented as a touch screen to receive input signals from the user. The touch panel may include one or more touch sensors, to sense touching, swiping, and gestures on the touch panel. The touch sensor may not only sense a boundary of the touching operation or swiping operation, but also detect a duration and pressure related to the touching operation or swiping operation. In some embodiments, the multimedia component 208 includes a front camera and/or a rear camera. When the device 200 for terminal software upgrading is in an operation mode, such as a shooting mode or a video mode, the front camera and/or the rear camera may receive external multimedia data. Each of the front camera and rear camera may be a fixed optical lens system or have focal length and optical zoom capabilities.

The audio component 210 is configured to output and/or input audio signals. For example, the audio component 210 includes a microphone (MIC). When the device 200 for terminal software upgrading is in an operation mode, such as a call mode, a recording mode, and a voice recognition mode, the microphone is configured to receive an external audio signal. The received audio signal may be further stored in the memory 204 or transmitted via the communication component 216. In some embodiments, the audio component 210 further includes a speaker for outputting audio signals.

The I/O interface 212 provides an interface between the processing component 202 and a peripheral interface module. The peripheral interface module may be a keyboard, a click wheel, a button and so on. These buttons may include, but are not limited to: home button, volume button, start button, and lock button.

The sensor assembly 214 includes one or more sensors for providing the status assessment of various aspects for the device 200 for terminal software upgrading. For example, the sensor component 214 can detect the on/off status of the device 200 for terminal software upgrading, and the relative positioning of the components, for example, the component is a display and a keypad of the device 200 for terminal software upgrading, and the sensor component 214 can also detect the position change of the device 200 or a component of the device 200, the presence or absence of user contact with the device 200, the orientation or acceleration/deceleration of the device 200, and the temperature change of the device 200. The sensor assembly 214 may include a proximity sensor configured to detect the presence of nearby objects without any physical contact. The sensor assembly 214 may also include a light sensor, such as a CMOS or CCD image sensor, for use in imaging applications. In some embodiments, the sensor assembly 214 may also include an acceleration sensor, a gyro sensor, a magnetic sensor, a pressure sensor, or a temperature sensor.

The communication component 216 is configured to facilitate wired or wireless communication between the device 200 for terminal software upgrading and other devices. The device 200 for terminal software upgrading can access a wireless network based on a communication standard, such as Wi-Fi, 2G, 3G, 4G, 5G, or a combination thereof. In some embodiments, the communication component 216 receives a broadcast signal or broadcast related information from an external broadcast management system via a broadcast channel. In some embodiments, the communication component 816 further includes a near-field communication (NFC) module to facilitate near-field communication. For example, the NFC module can be implemented based on radio frequency identification (RFID) technology, infrared data association (IrDA) technology, ultra-wideband (UWB) technology, Bluetooth (BT) technology and other technologies.

In some embodiments, the device 200 for terminal software upgrading may be implemented by one or more application specific integrated circuits (ASICs), digital signal processors (DSPs), digital signal processing devices (DSPDs), programmable logic devices (PLDs), Field programmable gate array (FPGA), controller, microcontroller, microprocessor or other electronic components, to execute the receiving method described in any of the above embodiments.

In some embodiments, there is also provided a non-transitory computer-readable storage medium including instructions, such as a memory 204 including instructions, which can be executed by the processor 220 of the device 200 for terminal software upgrading to complete the above method. For example, the non-transitory computer-readable storage medium may be ROM, random access memory (RAM), CD-ROM, magnetic tape, floppy disk, optical data storage device, or the like.

It can be understood that in the present disclosure, "a plurality of" refers to two or more than two, and other quantifiers are similar. The word "and/or" describes the association relationship of the associated object, indicating that there can be three types of relationships, for example, A and/or B, which can mean A exists alone, A and B exist at the same time, and B exists alone. The character "/" generally indicates that the associated objects before and after are in an "or" relationship. The singular forms "a", "said" and "the" are also intended to include plural forms, unless the context clearly indicates other meanings.

It can be further understood that the terms "first", "second", etc. are used to describe various information, but the information should not be limited to these terms. These terms are only used to distinguish the same type of information from each other, and do not indicate a specific order or degree of importance. In fact, expressions such as "first" and "second" can be used interchangeably. For example, without departing from the scope of the present disclosure, the first information may also be referred to as second information, and similarly, the second information may also be referred to as first information.

It can be further understood that the terms "center", "vertical", "horizontal", "front", "rear", "upper", "lower", "left", "right", "vertical", "horizontal", "top", "bottom", "inner", "outer", etc. indicate the orientation or positional relationship based on the orientation or positional relationship shown in the drawings, only for the convenience of describing the embodiment and simplifying the description, rather than indicating or implying that the device or element referred to must have a specific orientation, be constructed and operated in a specific orientation.

In the drawings, the same or similar reference numerals indicate the same or similar elements or elements with the same or similar functions throughout the present disclosure. The described embodiments are part of the embodiments of the present disclosure, but not all of the embodiments. The embodiments described above with reference to the accompanying drawings are exemplary, and are intended to explain the present disclosure, but should not be construed as limiting the present disclosure. Based on the embodiments in the present disclosure, all other embodiments obtained by those of ordinary skill in the art without creative work shall fall within the protection scope of the present disclosure. The embodiments of the present disclosure are described in detail above with reference to the accompanying drawings.

The various device components, units, circuits, blocks, or portions may have modular configurations, or are composed of discrete components, but nonetheless may be referred to as "modules," "components" or "circuits" in general. In other words, the components, units, circuits, blocks, or portions referred to herein may or may not be in modular forms.

The various device components, circuits, units, blocks, portions, or modules may be realized with hardware, software, or a combination of hardware and software.

In some embodiments of the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in some embodiments of the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In some embodiments of the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or retracted from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

What is claimed is:

1. A terminal software upgrade method, for applying to a terminal, and the terminal being installed with a near-field communication (NFC) sensing circuit, the terminal software upgrade method including:
    in response to a distance between a near-field communication instruction writing circuit and the terminal reaching an effective communication distance of a near-field communication, writing instruction information sent by the near-field communication instruction writing circuit into the near-field communication sensing circuit, wherein the instruction information comprises at least boot-up instruction information and upgrade configuration information; and
    controlling the terminal to boot up via the near-field communication sensing circuit, based on the boot-up instruction information, and upgrading software of the terminal based on the upgrade configuration information; wherein the controlling the terminal to boot up via the near-field communication sensing circuit, based on the boot-up instruction information comprises:
    controlling the terminal to boot up via the near-field communication sensing circuit, responsive to that the boot-up instruction information is a preset instruction; and
    maintaining a shutdown status of the terminal, responsive to that the boot-up instruction information is not the preset instruction.

2. The method according to claim 1, wherein the instruction information further comprises network configuration information and the upgrade configuration information comprises a download address of a software upgrade package, wherein the terminal software upgrade method further comprises:
    controlling the terminal to perform a network connection based on the network configuration information;
    wherein the upgrading the software of the terminal based on the upgrade configuration information comprises:
    responsive to that the terminal successfully establishes the network connection, then downloading the software upgrade package according to the download address upgrading the software of the terminal based on the software upgrade package.

3. The method according to claim 1, further comprising:
    sending upgrade status information to a first device that has established the network connection with the terminal, so as to display the upgrade status information of the terminal in the first device,
    wherein, the upgrade status information comprises one or more of an upgrade success, an upgrade failure, and an upgrade process.

4. The method according to claim 1, wherein before upgrading the software of the terminal based on the upgrade configuration information, the method further comprises:
    verifying legality of a software upgrade based on a verification instruction, and confirming that the verification is passed.

5. The method according to claim 4, further comprising:
controlling the terminal to shut down via the near-field communication sensing circuit, responsive to that the verification fails.

6. The method according to claim 1, wherein after upgrading the software of the terminal based on the upgrade configuration information, the method further comprises:
clearing up operating traces of the software upgrade.

7. A terminal software upgrade device, comprising:
a processor; and
memory for storing instructions executable by the processor;
wherein the processor is configured to
in response to a distance between a near-field communication instruction writing circuit and the terminal reaching an effective communication distance of a near-field communication, write instruction information sent by the near-field communication instruction writing circuit into the near-field communication sensing circuit, wherein the instruction information comprises at least boot-up instruction information and upgrade configuration information;
control the terminal to boot up via the near-field communication sensing circuit, based on the boot-up instruction information, and upgrading software of the terminal based on the upgrade configuration information;
control the terminal to boot up via the near-field communication sensing circuit, responsive to that the boot-up instruction information is a preset instruction; and
maintain a shutdown status of the terminal, responsive to that the boot-up instruction information is not the preset instruction.

8. The terminal software upgrade device according to claim 7, wherein the instruction information further comprises network configuration information and the upgrade configuration information comprises a download address of a software upgrade package, wherein the processor is configured to control the terminal to perform a network connection based on the network configuration information;
wherein the processor is further configured to download the software upgrade package according to the download address responsive to that the terminal successfully establishes the network connection, and upgrade the software of the terminal based on the software upgrade package.

9. The terminal software upgrade device according to claim 7, wherein the processor is further configured to send upgrade status information to a first device that has established the network connection with the terminal, so as to display the upgrade status information of the terminal in the first device,
wherein, the upgrade status information comprises one or more of an upgrade success, an upgrade failure, and an upgrade process.

10. The terminal software upgrade device according to claim 7, wherein the processor is further configured to verify legality of a software upgrade based on a verification instruction, and confirming that the verification is passed.

11. The terminal software upgrade device according to claim 10, wherein the processor is further configured to control the terminal to shut down via the near-field communication sensing circuit, responsive to that the verification fails.

12. The terminal software upgrade device according to claim 7, wherein the processor is further configured to clear up operating traces of the software upgrade.

13. A non-transitory computer-readable storage medium having computer programs stored thereon, wherein when the programs are performed by a processor of a mobile terminal, the mobile terminal implements a terminal software upgrade method,
and wherein the terminal software upgrade method comprises:
in response to a distance between a near-field communication instruction writing circuit and the terminal reaching an effective communication distance of a near-field communication, writing instruction information sent by the near-field communication instruction writing circuit into the near-field communication sensing circuit, wherein the instruction information comprises at least boot-up instruction information and upgrade configuration information; and
controlling the terminal to boot up via the near-field communication sensing circuit, based on the boot-up instruction information, and upgrading software of the terminal based on the upgrade configuration information;
wherein the controlling the terminal to boot up via the near-field communication sensing circuit, based on the boot-up instruction information comprises:
controlling the terminal to boot up via the near-field communication sensing circuit, responsive to that the boot-up instruction information is a preset instruction;
the terminal software upgrade method further comprising:
maintaining a shutdown status of the terminal, responsive to that the boot-up instruction information is not the preset instruction.

14. The non-transitory computer-readable storage medium according to claim 13, wherein the instruction information further comprises network configuration information and the upgrade configuration information comprises a download address of a software upgrade package, wherein the terminal software upgrade method further comprises:
controlling the terminal to perform a network connection based on the network configuration information;
wherein the upgrading the software of the terminal based on the upgrade configuration information comprises:
responsive to that the terminal successfully establishes the network connection, downloading the software upgrade package according to the download address and upgrading the software of the terminal based on the software upgrade package.

15. The non-transitory computer-readable storage medium according to claim 13, wherein the terminal software upgrade method further comprises:
sending upgrade status information to a first device that has established the connect connection with the terminal, so as to display the upgrade status information of the terminal in the first device,
wherein, the upgrade status information comprises one or more of an upgrade success, an upgrade failure, and an upgrade process.

16. The non-transitory computer-readable storage medium according to claim 13, wherein before upgrading the software of the terminal based on the upgrade configuration information, wherein the terminal software upgrade method further comprises:
verifying legality of a software upgrade based on a verification instruction, and confirming that the verification is passed.

* * * * *